(12) United States Patent
Boyapalle et al.

(10) Patent No.: US 11,431,787 B1
(45) Date of Patent: Aug. 30, 2022

(54) MANAGING CLOUD NATIVE WORKLOADS AT AN INFORMATION HANDLING SYSTEM

(71) Applicant: Dell Products L.P., Round Rock, TX (US)

(72) Inventors: Anantha K. Boyapalle, Cedar Park, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/448,104

(22) Filed: Sep. 20, 2021

(51) Int. Cl.
*H04L 67/10* (2022.01)
*H04L 67/02* (2022.01)

(52) U.S. Cl.
CPC .............. *H04L 67/10* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,621,381 | B1* | 12/2013 | Weber | G06F 3/0488 715/812 |
| 9,424,102 | B2* | 8/2016 | Boenisch | G06F 9/4843 |
| 9,658,747 | B2* | 5/2017 | Rossi | G06F 3/0483 |
| 9,928,083 | B2* | 3/2018 | Joo | G06F 9/451 |
| 10,275,116 | B2* | 4/2019 | Decker | G06F 3/0482 |
| 10,324,998 | B2* | 6/2019 | Romanenko | G06F 16/957 |
| 2012/0179744 | A1* | 7/2012 | Sullivan | G06F 9/451 709/203 |
| 2012/0331407 | A1* | 12/2012 | Ainslie | G06F 16/954 715/760 |
| 2012/0331408 | A1* | 12/2012 | Ainslie | G06F 16/954 715/760 |
| 2014/0333633 | A1* | 11/2014 | Zhang | G09G 5/003 345/503 |
| 2015/0095838 | A1* | 4/2015 | Rossi | G06F 3/0483 |
| 2017/0199638 | A1* | 7/2017 | Bhupatiraju | G06F 16/9577 |
| 2018/0373801 | A1* | 12/2018 | Nance | G06F 16/9574 |

(Continued)

OTHER PUBLICATIONS

Gurung, Ram Bahadur. "Random Forest for Histogram Data," DSV Report Series No. 20-003, Stockholm University, 2020.

(Continued)

*Primary Examiner* — Lashonda Jacobs-Burton
(74) *Attorney, Agent, or Firm* — Baker Botts, L.L.P.

(57) ABSTRACT

Managing cloud native workloads at an information handling system, including obtaining, for each tab of a plurality of tabs of a web browser executing on an information handling system, parameters associated with execution of the tab of the web browser; determining, for each tab of the web browser, a reactivation probability of the tab based on the parameters of the tab; comparing, for each tab of the web browser, the reactivation probability to a first threshold; determining, based on the comparing, that a first tab of the tabs is associated with a first reactivation probability greater than the first threshold; in response to determining that the first tab is associated with a first reactivation probability greater than the first threshold, assigning the first tab of the web browser to a first grouping; and maintaining execution of the first tab based on the first grouping.

14 Claims, 3 Drawing Sheets

(56) References Cited

U.S. PATENT DOCUMENTS

2020/0394234 A1\* 12/2020 Chikkala ............. G06F 16/9577
2021/0064402 A1\* 3/2021 Jenks ....................... G09G 5/14

OTHER PUBLICATIONS

Kingsley-Hughes, Adrian. "Google proved me right, Chrome was a bloated memory hog," Retrieved from url: https://www.zdnet.com/article/google-proved-me-right-chrome-was-a-bloated-memory-hog/, Apr. 2, 2021.

Brinkmann, Martin. "Which browser has the best Tab Snoozing / Sleeping / Freezing implementation?" Retrieved from url: https://www.ghacks.net/2021/01/26/which-browser-has-the-best-tab-snoozing-sleeping-freezing-implementation/, Jan. 26, 2021.

\* cited by examiner

MANAGING CLOUD NATIVE WORKLOADS AT AN INFORMATION HANDLING SYSTEM

BACKGROUND

Field of the Disclosure

The disclosure relates generally to an information handling system, and in particular, managing cloud-based workloads at the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Workloads are trending to move to the cloud as opposed to being natively executed.

SUMMARY

Innovative aspects of the subject matter described in this specification may be embodied in a method of managing cloud-based workloads, including obtaining, for each tab of a plurality of tabs of a web browser executing on an information handling system, parameters associated with execution of the tab of the web browser; determining, for each tab of the web browser, a reactivation probability of the tab based on the parameters of the tab; comparing, for each tab of the web browser, the reactivation probability to a first threshold; determining, based on the comparing, that a first tab of the tabs is associated with a first reactivation probability greater than the first threshold; in response to determining that the first tab is associated with a first reactivation probability greater than the first threshold, assigning the first tab of the web browser to a first grouping; and maintaining execution of the first tab based on the first grouping.

Other embodiments of these aspects include corresponding systems, apparatus, and computer programs, configured to perform the actions of the methods, encoded on computer storage devices.

These and other embodiments may each optionally include one or more of the following features. For instance, identifying hardware resources of the information handling system; and identifying, for each tab of the web browser, driver handles of the hardware resources that are being utilized by the tab. Determining, based on the comparing, that a second tab of the tabs is associated with a second reactivation probability less than the first threshold; in response to determining that second tab is associated with the second reactivation probability less than the first threshold, comparing the second reactivation probability with a second threshold, the second threshold less than the first threshold; determining, based on the comparing, that the second tab is associated with the second reactivation probability greater than the second threshold; in response to determining that the second tab is associated with the second reactivation probability greater than the second threshold and less than the first threshold, assigning the second tab of the web browser to a second grouping; and hibernating execution of the second tab based on the second grouping, including temporarily releasing the hardware resources associated with the driver handles utilized by the second tab. Identifying, at a later time, that the second tab is active, and in response, re-attaching the driver handles with the second tab such that the second tab can access the hardware resources associated with the driver handles. Determining, based on the comparing, that a third tab of the tabs is associated with a third reactivation probability less than the first threshold; in response to determining that third tab is associated with the third reactivation probability less than the first threshold, comparing the third reactivation probability with the second threshold; determining, based on the comparing, that the third tab is associated with the third reactivation probability less than the second threshold; in response to determining that the third tab is associated with the third reactivation probability less than the second threshold, assigning the third tab of the web browser to a third grouping; and permanently hibernating execution of the third tab based on the third grouping, including permanently releasing the hardware resources associated with the driver handles utilized by the third tab. The parameters associated with execution of the tab of the web browser include amount of time that tab is actively engaged with over a time period. The parameters associated with execution of the tab of the web browser include a frequency of use of the tab over a time period.

Particular implementations of the subject matter described in this specification can be implemented so as to realize one or more of the following advantages. For example, tabs of a web browser can selectively be hibernated or maintained based on context to optimize the user experience while minimizing performance overhead.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for managing cloud-based workloads at an information handling system. In short, a browser of the information handling system can include a browser extension that, based on context and usage patterns, can determine which tabs of the browser to place in different hibernation states. The context can include frequency of use of the tab, time of use of the tab, and other contextual data associated with use of the tabs of the browser. Based on such contextual data, execution of the tabs of the browser can be selectively maintained, temporarily hibernated, or permanently hibernated. Temporary hibernation or permanent hibernation of tabs can free computing resources.

Specifically, this disclosure discusses a system and a method for managing cloud-based workloads, including obtaining, for each tab of a plurality of tabs of a web browser executing on an information handling system, parameters associated with execution of the tab of the web browser; determining, for each tab of the web browser, a reactivation probability of the tab based on the parameters of the tab; comparing, for each tab of the web browser, the reactivation probability to a first threshold; determining, based on the comparing, that a first tab of the tabs is associated with a first reactivation probability greater than the first threshold; in response to determining that the first tab is associated with a first reactivation probability greater than the first threshold, assigning the first tab of the web browser to a first grouping; and maintaining execution of the first tab based on the first grouping.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 1:
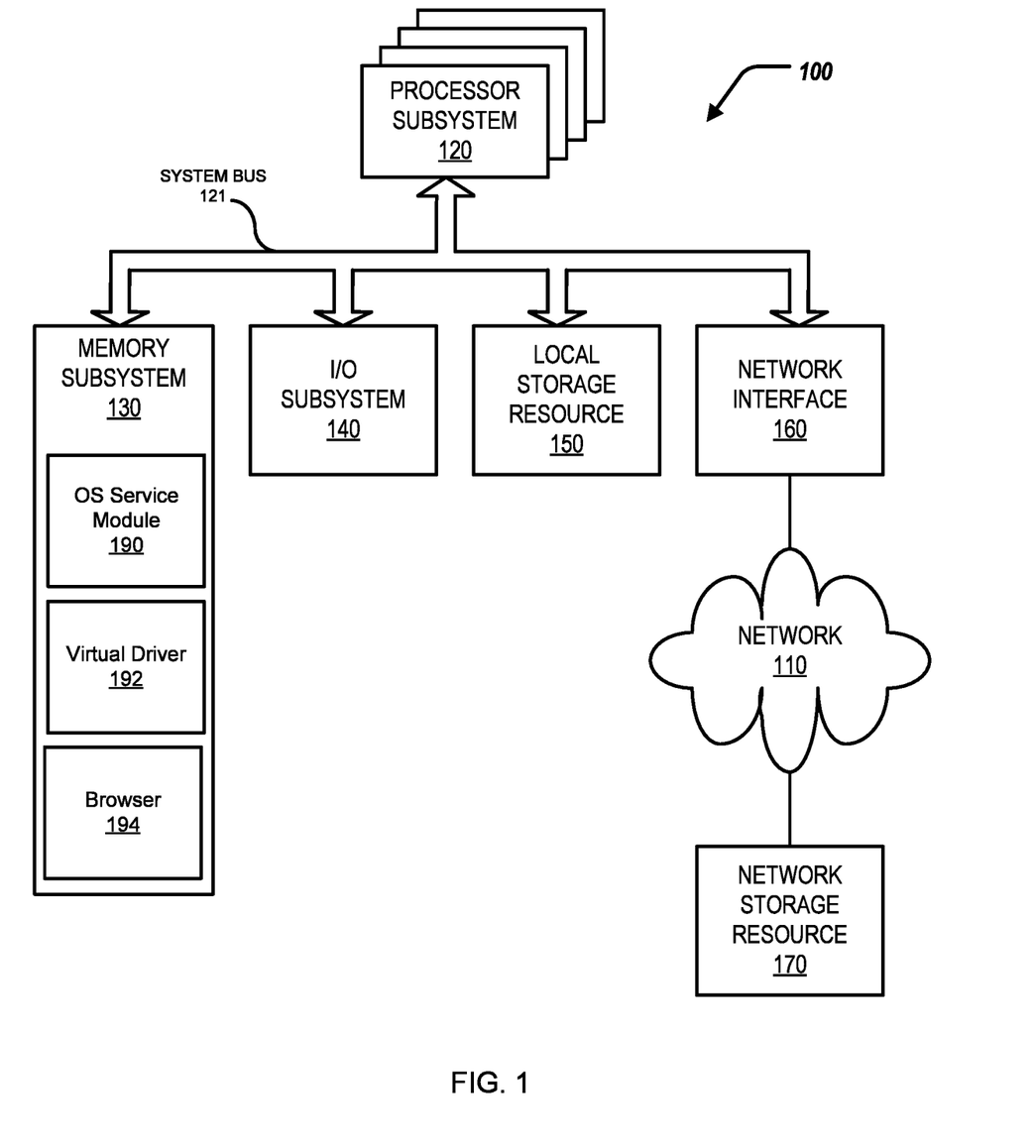
FIG. 1 is a block diagram of selected elements of an embodiment of an information handling system.
Figure 2:
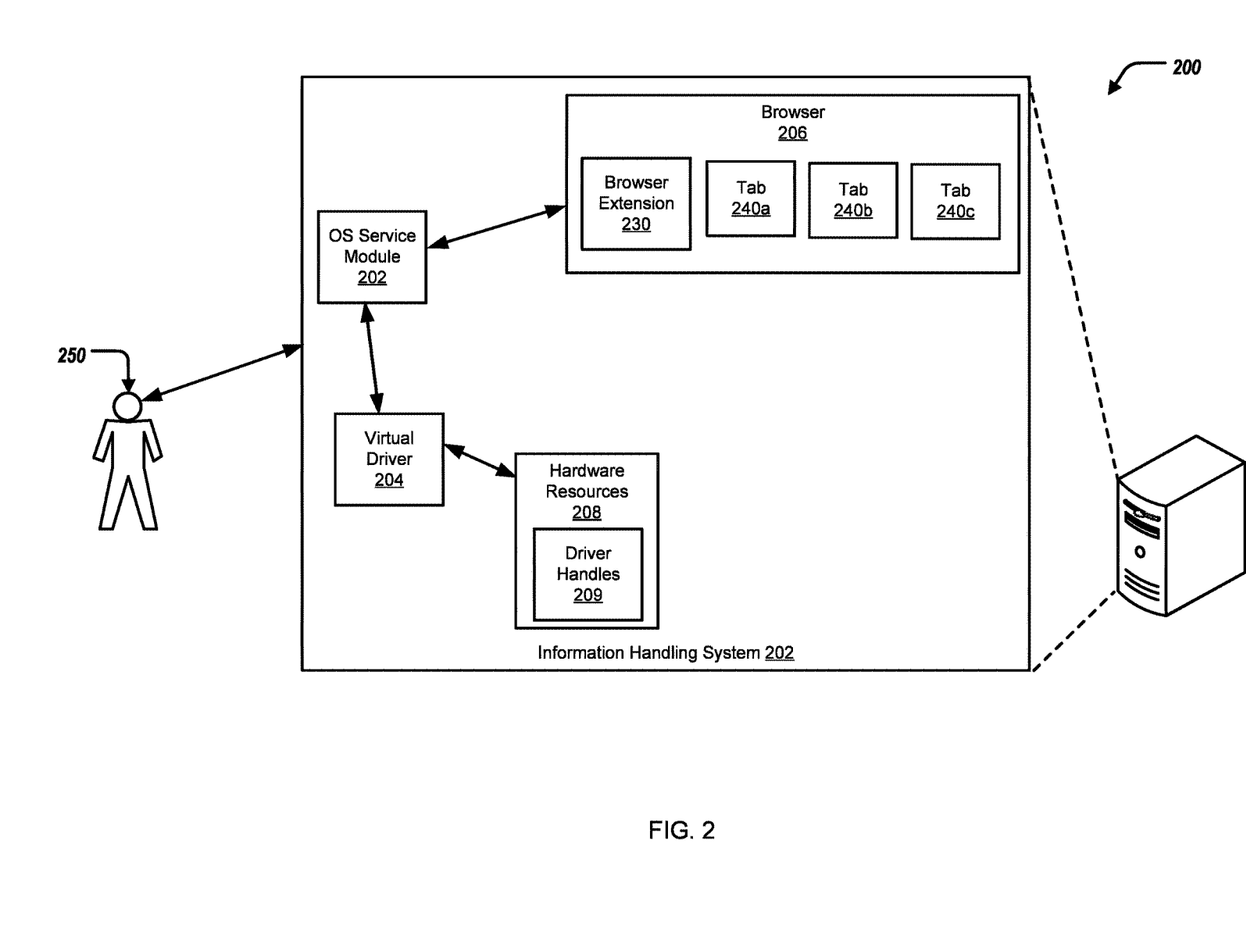
FIG. 2 illustrates a block diagram of an information handling system for managing cloud-based workloads at the information handling system.
Figure 3:
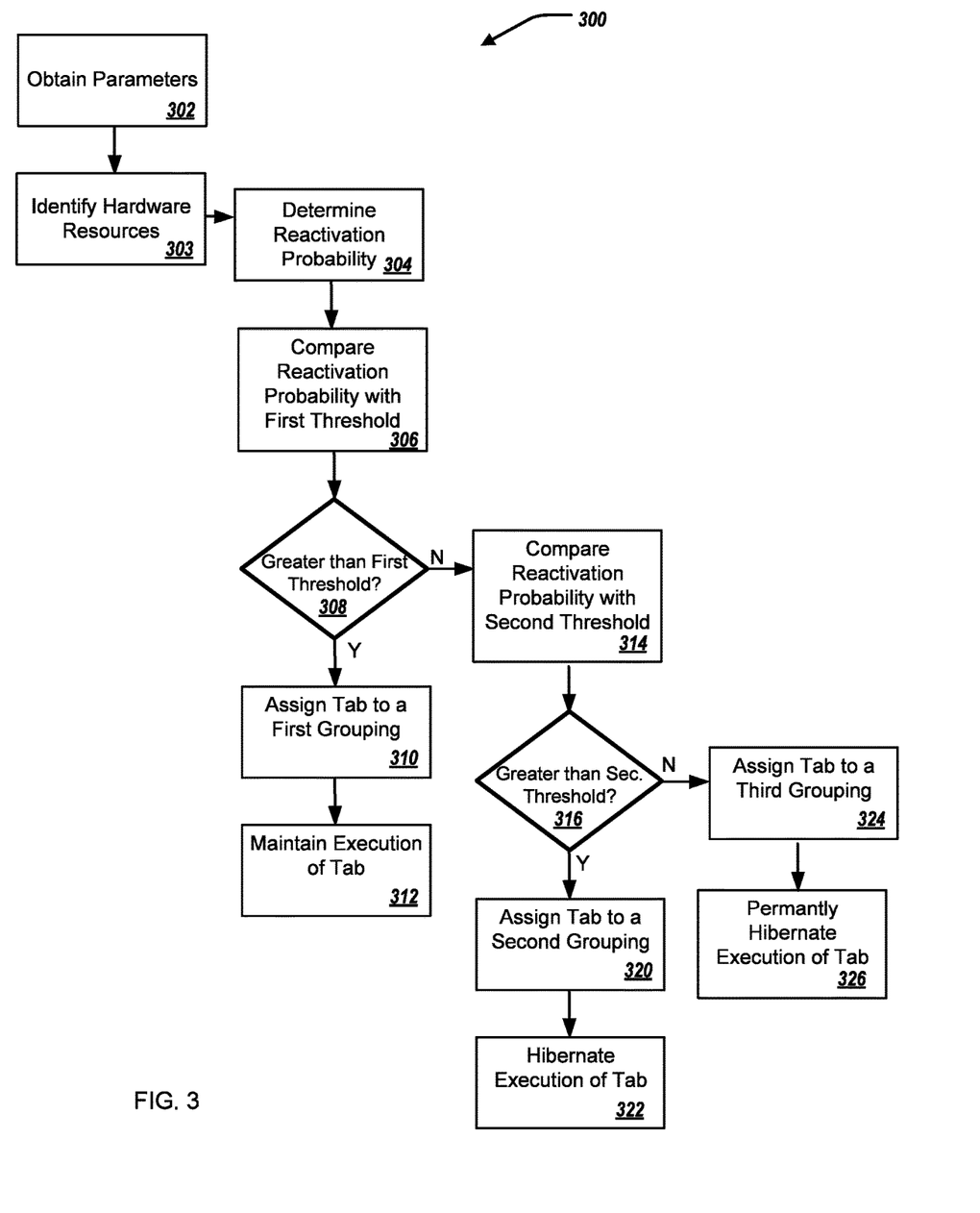
FIG. 3 illustrates a method for managing cloud-based workloads at the information handling system.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an operating system (OS) service module 190. The OS service module 190 can be included by the memory subsystem 130. The OS service module 190 can include a system software that manages hardware resources, software resources, and provides services for applications. The OS service module 190 can be executed by the processor subsystem 120.

The information handling system 100 can also include a virtual driver 192. The virtual driver 192 can be included by the memory subsystem 130. The virtual driver 192 can include a computer-executable program (software). The virtual driver 192 can be executed by the processor subsystem 120.

The information handling system 100 can also include a browser 194. The browser 194 can be included by the memory subsystem 130. The browser 194 can include a computer-executable program (software). The browser 194 can be executed by the processor subsystem 120.

In short, the browser 194 can include a browser extension that, based on context and usage patterns, can determine which tabs of the browser to place in different hibernation states. The context can include frequency of use of the tab, time of use of the tab, and other contextual data associated with use of the tabs of the browser. Based on such contextual data, execution of the tabs of the browser can be selectively maintained, temporarily hibernated, or permanently hibernated. Temporary hibernation or permanent hibernation of tabs can free computing resources.

Turning to FIG. 2, FIG. 2 illustrates an environment 200 including an information handling system 202. The information handling system 202 can include a OS service module 202, a virtual driver 204, a browser 206, and hardware resources 208. In some examples, the information handling system 202 is similar to, or includes, the information handling system 100 of FIG. 1. In some examples, the OS service module 202 is the same, or substantially the same, as the OS service module 190 of FIG. 1. In some examples, the virtual driver 204 is the same, or substantially the same, as the virtual driver 192 of FIG. 1. In some examples, the browser 206 is the same, or substantially the same, as the browser 194 of FIG. 1. In some examples, the context identification computing module 220 is the same, or substantially the same, as the context identification computing module 196 of FIG. 1.

The OS service module 202 can be in communication with the browser 206 and the virtual driver 204. The virtual driver 204 can be in communication with the OS service module 202 and the hardware resources 208. The browser 206 can be in communication with the OS service module 202. The hardware resources 208 can be in communication with the virtual driver 204.

The browser 206 can be a web browser for accessing the world wide web (e.g., the "Internet"). The browser 206 can include a browser extension 230. The browser extension 230 can be a computer-executable software module that can "customize" the browser 206. Additionally, the browser 206 can include multiple interfaces or instances, such as tabs, shown as tab 240a, tab 240b, tab 240c (collectively referred to as tabs 240).

A user 250 can interact with the information handling system 202, and specifically, interact with the browser 206. For example, the user 250 can interact with the browser (via a mouse, keyboard, or touchscreen) through a graphical user interface (GUI) that provides for display a graphical representation of the browser 206, and the tabs 240. The GUI can be provided for display by a display device (not shown) of the information handling system 202.

FIG. 3 illustrates a flowchart depicting selected elements of an embodiment of a method 300 for managing cloud-based workloads at the information handling system. The method 300 may be performed by the information handling system 100, the information handling system 202, the OS service module 202, the virtual driver 204, the browser 206, and/or the browser extension 230, and with reference to FIGS. 1-2. It is noted that certain operations described in method 300 may be optional or may be rearranged in different embodiments.

Specifically, the browser extension 230 can obtain, for each tab 240 of the browser 206 executing on the information handling system 202, parameters associated with execution of the tab 240 of the browser 206, at 302.

In some examples, the parameters associated with the execution of the tab 240 includes an amount of time that the tab 240 is actively engaged with (e.g., by the user 250) over a time period. For example, within a time period, such as 30 minutes, the user 250 can actively engage with the tab 240 for 15 minutes; or engage for a percentage of the time period, e.g., 60% of the time period. Engaging with the tab 240 can include actively viewing/vision gaze of the user 250 (e.g., as determined by a vision gaze detection system and/or camera) with respect to the GUI displaying the visual representation of the tab 240. Engaging with the tab 240 can include the user 250 interacting with display elements of the GUI that is displaying the visual representation of the tab 240—e.g., moving a cursor graphical element with respect to the tab 240 by an input device such as a handheld pointing device (mouse), providing textual input into form fields of the graphical representation of the tab 240 by an input device such as a keyboard device, and/or providing touch input by a touchscreen.

In some examples, the parameters associated with execution of the tab 240 includes a frequency of use of the tab 240 (e.g., by the user 250) over a time period. For example, within a time period, such as 30 minutes, the user 250 can engage with the tab 240 a number of times (e.g., greater than a threshold). Engaging with the tab 240 can include the user 250 interacting with display elements of the GUI that is displaying the visual representation of the tab 240 a frequency of times—e.g., moving a cursor graphical element with respect to the tab 240 by an input device such as a handheld pointing device (mouse), providing textual input into form fields of the graphical representation of the tab 240 by an input device such as a keyboard device a frequency of times, and/or providing touch input by a touchscreen a frequency of times.

In some examples, the parameters associated with execution of the tab 240 can include a frequency of "opening" the tab 250 (e.g., by the user 250) over a time period. That is, the number of times the user 250 opened (brought the tab 240 to be actively displayed within the UI) within a time period (e.g., greater than a frequency threshold).

In some examples, the parameters associated with execution of the tab 240 can include a distance between the user 250 and the display device displaying the GUI that is displaying the visual representation of the tab 240. That is, a distance less than a threshold can indicate an engagement by the user 250 with the tab 240. For example, a distance of approximately 1 foot away from the display device can indicate engagement by the user 250 with the tab 240.

In some examples, the parameters associated with the execution of the tab 240 includes posture positioning of the information handling system 202. That is, in some examples, the information handling system 202 can include a dual-body device that is rotatable about a hinge coupling the bodies of the information handling system 202. The posture positioning of the information handling system 202 can be based on an angle between the bodies of the information handling system 202. Based on the angle between the bodies of the information handling system 202, the information handling system 202 can be in a table top posture mode, a book posture mode, or a tent posture mode. The type of posture mode of the information handling system 202 can indicate an engagement by the user 250 with the tab 240. For example, based on the combination of the posture mode, the thresholds associated with the frequency of use of the tab 240 and/or the time of engagement with the tab 240 can vary to indicate engagement by the user 250 with the tab 240. For example, for a table top posture mode, a frequency threshold of use of the tab 240 over the time period to indicate engagement can be greater than a frequency threshold of use of the tab 450 over the time period for the book posture mode.

In some examples, the parameters associated with execution of the tab 240 includes environmental parameters such as time or location of the user 250 and the information handling system 202. That is, based on the time and/or the location of the user 250 and the information handling system 202, the thresholds associated with the frequency of use of the tab 240 and/or the time of engagement with the tab 240 can vary to indicate engagement by the user 250 with the tab 240. For example, for a time between 8 am-10 am and at a location of work of the user 250, a frequency threshold of use of the tab 240 over the time period to indicate engagement can be greater than a frequency threshold of use of the tab 240 associated with a time of 10 pm-11 pm and a location of home of the user 250.

In some implementations, the virtual driver 204 can identify the hardware resources 208 of the information handling system 202, at 303. That is, the virtual driver 204 can identify (discover) platform capabilities of the information handling system 202. For example, the capabilities of the hardware resources 208 can include audio capabilities, video capabilities, Bluetooth capable, wireless (WiFi) capabilities, and similar. The virtual driver, for each tab 240, can identify driver handles 209 of the hardware resources 208 that are being utilized by the tab 240. For example, the virtual driver 204 can identify (capture) the driver handles 209 that are used by each of the tabs 240. For example, the virtual driver 204 can identify that the tab 240a is utilizing a driver handle 208 associated with a camera hardware resource 208 and that the tab 240b is utilizing a driver handle 208 associated with a video hardware resource 208.

In some implementations, the browser extension 230 can determine, for each tab 240 of the browser 206, a reactivation probability of the tab 240 based on the parameters of the tab 240, at 304. In short, the reactivation probability is the probability that the tab 240 will be engaged (or re-engaged) with by the user 250. For example, after a time threshold of inactivity or no engagement or limited engagement by the user 250 with the tab 240, the reactivation probability can be the probability that the user 250 will engage or interact with the tab 240 again at a later time. In some examples, the reactivation probability for each tab 240 can have a value between 0 and 1. In some examples, the reactivation probability of the tab 250 is based on a histogram algorithm. In some examples, the reactivation probability of the tab 250 is based on a frequency ranking algorithm.

In some implementations, the browser extension 230 can compare, for each tab 240 of the browser 206, the reactivation probability to a first threshold, at 306. The first threshold can be based on predetermined reactivation level for differing computing states of the tab 240 and/or the browser 206, described further herein.

The browser extension 230, based on the comparing, can determine whether the first tab 240a is associated with a first reactivation probability greater than the first threshold, at 308. In some examples, the browser extension 230 can determine that the first tab 240a is associated with the first reactivation probability greater than the first threshold. The browser extension 230, in response to determining that the first tab 240a is associated with a first reactivation probability greater than the first threshold, assigns the first tab 230a to a first grouping, at 310. For example, the first grouping of tabs 240 can include all tabs having a reactivation probability greater than the first threshold.

The virtual driver 204 maintains the execution of the first tab 240a based on the first grouping, at 312. For example, the first tab 240a is "kept alive." In other words, the first tab 240a and the workloads associated with the first tab 240a (e.g., the hardware resources 208 associated with the first tab 240a) are kept running/executing independent of whether the first tab 240a is in the active foreground or not. The virtual driver 204 can maintain the execution of the first tab 240a through the OS service module 202 by maintaining execution of the corresponding hardware resources 208 of the first tab 240a via the associated driver handles 209.

The browser extension 230, based on the comparing, can determine whether the second tab 240b is associated with a second reactivation probability less than the first threshold, at 308. In some examples, the browser extension 230 can determine that the second tab 240b is associated with the second reactivation probability less than the first threshold, at 308. The browser extension 230, in response to determining that the second tab 240b is associated with the second reactivation probability less than the first threshold, compares the second reactivation probability with a second threshold, at 314. The second threshold can be less than the first threshold.

The browser extension 230, based on the comparing, can determine whether the second tab 240b is associated with the second reactivation probability greater than the second threshold, at 316. In some examples, the browser extension 230 can determine that the second tab 240b is associated with the second reactivation probability greater than the second threshold. The browser extension 230, in response to determining that the second tab 240b is associated with the second reactivation probability greater than the second threshold, assigns the second tab 230b to a second grouping, at 320. For example, the second grouping of tabs 240 can include all tabs having a reactivation probability greater than the second threshold and less than the first threshold.

The virtual driver 204 hibernates execution of the second tab 240b based on the second grouping, at 322. In some examples, hibernating execution of the second tab 240b can include temporarily releasing the hardware resources 208 associated with the driver handles 209 utilized by the second tab 240b. That is, the second tab 240b is hibernated in the background and the hardware resources 208 that are associated with the second tab 240b by the driver handles 209 are released to consume less memory.

The browser extension 230, based on the comparing, can determine whether the third tab 240c is associated with a third reactivation probability less than the first threshold, at 308. In some examples, the browser extension 230 can determine that the third tab 240c is associated with the third reactivation probability less than the first threshold. The browser extension 230, in response to determining that the third tab 240c is associated with the third reactivation probability less than the first threshold, compares the third reactivation probability with the second threshold, at 314. The browser extension 230, based on the comparing, can determine whether the third tab 240c is associated with the third reactivation probability greater than the second threshold, at 316. In some examples, the browser extension 230 can determine that the third tab 240b is associated with the third reactivation probability less than the second threshold. The browser extension 230, in response to determining that the third tab 240c is associated with the third reactivation probability less than the third threshold, assigns the third tab 230c to a third grouping, at 324. For example, the third grouping of tabs 240 can include all tabs having a reactivation probability less than the second threshold.

The virtual driver 204 permanently hibernates execution of the third tab 240c based on the third grouping, at 326. That is, the hardware resources 208 associated with the driver handles 209 utilized by the third tab 240c are permanently released. In some examples, permanently hibernating execution of the third tab 240c can include permanently releasing the hardware resources 208 associated with the driver handles 209 utilized by the third tab 240c.

In some examples, at a later time, the browser extension 230 can identify that the second tab 240b is active (actively engaged by the user 250). In response, the virtual driver 204, through the OS service module 202, in response, can re-attach the driver handles 209 with the second tab 240b such that the second tab 240b can access the hardware resources 208 associated with the driver handles 209.

In an use case example, the first tab 240a can execute a video conferencing interface while the second tab 240b can provide for presentation a display document for the video conference. The browser extension 230 can maintain the execution of both the first tab 240a and the second tab 240b, including the hardware resources associated with the first tab 240a and the second tab 240b.

In an use case example, the first tab 240a is executing a document based web interface. The browser extension 230 determines that the first tab 240a has not been engaged with greater than a threshold amount of time and the reactivation probability of the first tab 240a is less than the first threshold but greater than the second threshold. The virtual driver 204 temporarily hibernates execution of the hardware resources 208 of the driver handles 209 associated with the first tab 240a.

In an use case example, the first tab 240a is executing an email-based interface. The browser extension 230 determines that the first tab 240a has not been engaged with greater than a threshold amount of time and the reactivation probability of the first tab 240a is less than the first threshold but greater than the second threshold. The virtual driver 204 temporarily hibernates execution of the hardware resources 208 of the driver handles 209 associated with the first tab 240a.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing cloud-based workloads, comprising:
    identifying hardware resources of an information handling system;
    obtaining, for each tab of a plurality of tabs of a web browser executing on the information handling system, parameters associated with execution of the tab of the web browser and driver handles of the hardware resource that are being utilized by the tab;
    determining, for each tab of the web browser, a reactivation probability of the tab based on the parameters of the tab;
    comparing, for each tab of the web browser, the reactivation probability to a first threshold;
    determining, based on the comparing, that a first tab of the tabs is associated with a first reactivation probability greater than the first threshold;
    in response to determining that the first tab is associated with a first reactivation probability greater than the first threshold, assigning the first tab of the web browser to a first grouping and maintaining execution of the first tab based on the first grouping;
    determining, based on the comparing, that a second tab of the tabs is associated with a second reactivation probability less than the first threshold and in response, comparing the second reactivation probability with a second threshold, the second threshold less than the first threshold; and
    determining, based on the comparing, that the second tab is associated with the second reactivation probability greater than the second threshold, and in response, assigning the second tab of the web browser to a second grouping, and hibernating execution of the second tab based on the second grouping, including temporarily releasing the hardware resources associated with the driver handles utilized by the second tab.

2. The computer-implemented method of claim 1, further comprising:
    identifying, at a later time, that the second tab is active, and in response, re-attaching the driver handles with the second tab such that the second tab can access the hardware resources associated with the driver handles.

3. The computer-implemented method of claim 1, further comprising:
    determining, based on the comparing, that a third tab of the tabs is associated with a third reactivation probability less than the first threshold;
    in response to determining that third tab is associated with the third reactivation probability less than the first threshold, comparing the third reactivation probability with the second threshold;
    determining, based on the comparing, that the third tab is associated with the third reactivation probability less than the second threshold;
    in response to determining that the third tab is associated with the third reactivation probability less than the second threshold, assigning the third tab of the web browser to a third grouping; and
    permanently hibernating execution of the third tab based on the third grouping, including permanently releasing the hardware resources associated with the driver handles utilized by the third tab.

4. The computer-implemented method of claim 1, wherein the parameters associated with execution of the tab of the web browser include amount of time that tab is actively engaged with over a time period.

5. The computer-implemented method of claim 1, wherein the parameters associated with execution of the tab of the web browser include a frequency of use of the tab over a time period.

6. An information handling system comprising a processor having access to non-transitory memory media storing instructions executable by the processor to perform operations, comprising:
    identifying hardware resources of the information handling system;
    obtaining, for each tab of a plurality of tabs of a web browser executing on the information handling system, parameters associated with execution of the tab of the web browser and driver handles of the hardware resource that are being utilized by the tab;
    determining, for each tab of the web browser, a reactivation probability of the tab based on the parameters of the tab;
    comparing, for each tab of the web browser, the reactivation probability to a first threshold;
    determining, based on the comparing, that a first tab of the tabs is associated with a first reactivation probability greater than the first threshold;
    in response to determining that the first tab is associated with a first reactivation probability greater than the first threshold, assigning the first tab of the web browser to a first grouping and maintaining execution of the first tab based on the first grouping;
    determining, based on the comparing, that a second tab of the tabs is associated with a second reactivation probability less than the first threshold and in response, comparing the second reactivation probability with a second threshold, the second threshold less than the first threshold; and determining, based on the comparing, that the second tab is associated with the second reactivation probability greater than the second threshold, and in response, assigning the second tab of the web browser to a second grouping, and hibernating execution of the second tab based on the second grouping, including temporarily releasing the hardware resources associated with the driver handles utilized by the second tab.

7. The information handling system of claim 6, the operations further comprising:

identifying, at a later time, that the second tab is active, and in response, re-attaching the driver handles with the second tab such that the second tab can access the hardware resources associated with the driver handles.

8. The information handling system of claim 6, the operations further comprising:

determining, based on the comparing, that a third tab of the tabs is associated with a third reactivation probability less than the first threshold;

in response to determining that third tab is associated with the third reactivation probability less than the first threshold, comparing the third reactivation probability with the second threshold;

determining, based on the comparing, that the third tab is associated with the third reactivation probability less than the second threshold;

in response to determining that the third tab is associated with the third reactivation probability less than the second threshold, assigning the third tab of the web browser to a third grouping; and permanently hibernating execution of the third tab based on the third grouping, including permanently releasing the hardware resources associated with the driver handles utilized by the third tab.

9. The information handling system of claim 6, wherein the parameters associated with execution of the tab of the web browser include amount of time that tab is actively engaged with over a time period.

10. The information handling system of claim 6, wherein the parameters associated with execution of the tab of the web browser include a frequency of use of the tab over a time period.

11. A non-transitory computer-readable medium storing software comprising instructions executable by one or more computers which, upon such execution, cause the one or more computers to perform operations comprising:

identifying hardware resources of the information handling system;

obtaining, for each tab of a plurality of tabs of a web browser executing on the information handling system, parameters associated with execution of the tab of the web browser and driver handles of the hardware resource that are being utilized by the tab;

determining, for each tab of the web browser, a reactivation probability of the tab based on the parameters of the tab;

comparing, for each tab of the web browser, the reactivation probability to a first threshold;

determining, based on the comparing, that a first tab of the tabs is associated with a first reactivation probability greater than the first threshold;

in response to determining that the first tab is associated with a first reactivation probability greater than the first threshold, assigning the first tab of the web browser to a first grouping and maintaining execution of the first tab based on the first grouping;

determining, based on the comparing, that a second tab of the tabs is associated with a second reactivation probability less than the first threshold and in response, comparing the second reactivation probability with a second threshold, the second threshold less than the first threshold; and determining, based on the comparing, that the second tab is associated with the second reactivation probability greater than the second threshold, and in response, assigning the second tab of the web browser to a second grouping, and hibernating execution of the second tab based on the second grouping, including temporarily releasing the hardware resources associated with the driver handles utilized by the second tab.

12. The computer-readable medium of claim 11, the operations further comprising:

identifying, at a later time, that the second tab is active, and in response, re-attaching the driver handles with the second tab such that the second tab can access the hardware resources associated with the driver handles.

13. The computer-readable medium of claim 11, the operations further comprising:

determining, based on the comparing, that a third tab of the tabs is associated with a third reactivation probability less than the first threshold;

in response to determining that third tab is associated with the third reactivation probability less than the first threshold, comparing the third reactivation probability with the second threshold;

determining, based on the comparing, that the third tab is associated with the third reactivation probability less than the second threshold;

in response to determining that the third tab is associated with the third reactivation probability less than the second threshold, assigning the third tab of the web browser to a third grouping; and permanently hibernating execution of the third tab based on the third grouping, including permanently releasing the hardware resources associated with the driver handles utilized by the third tab.

14. The computer-readable medium of claim 11, wherein the parameters associated with execution of the tab of the web browser include amount of time that tab is actively engaged with over a time period.

* * * * *